US012719312B2

(12) United States Patent
AbuKhalaf et al.

(10) Patent No.: US 12,719,312 B2
(45) Date of Patent: Aug. 25, 2026

(54) WIRELESS POWER TRANSFER PROFILES

(71) Applicant: Apple Inc., Cupertino, CA (US)

(72) Inventors: Zaid A AbuKhalaf, Sunnyvale, CA (US); Alin I Gherghescu, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/952,398

(22) Filed: Nov. 19, 2024

(65) Prior Publication Data

US 2025/0253715 A1 Aug. 7, 2025

Related U.S. Application Data

(60) Provisional application No. 63/549,731, filed on Feb. 5, 2024.

(51) Int. Cl.
*H02J 50/60* (2016.01)
*H01F 38/14* (2006.01)
(Continued)

(52) U.S. Cl.
CPC .............. *H02J 50/60* (2016.02); *H02J 50/10* (2016.02); *H02J 50/70* (2016.02); *H02J 50/80* (2016.02); *H01F 38/14* (2013.01)

(58) Field of Classification Search
CPC .. H02J 50/10; H02J 50/60; H02J 50/70; H02J 50/80; H01F 38/14
See application file for complete search history.

(56) References Cited

U.S. PATENT DOCUMENTS

| | | | | |
|---|---|---|---|---|
| 8,169,185 | B2 | 5/2012 | Partovi et al. | |
| 11,121,580 | B2 * | 9/2021 | Partovi | H02J 50/402 |

(Continued)

FOREIGN PATENT DOCUMENTS

| | | | |
|---|---|---|---|
| CN | 101645619 | B | 2/2010 |
| JP | 2022169522 | A | 11/2022 |

OTHER PUBLICATIONS

U.S. Appl. No. 63/583,001, filed Sep. 15, 2023, Grabas et al.
Anonymous: "Qi Specification—Power Delivery (Version 1.3)" Wireless Power Consortium, Jan. 1, 2021 (XP093212389); pgs.

*Primary Examiner* — Rexford N Barnie
*Assistant Examiner* — Joseph N Inge
(74) *Attorney, Agent, or Firm* — FLETCHER YODER PC

(57) ABSTRACT

Negotiating a power loss accounting profile (PLAP) for detecting a foreign object associated with wireless power transfer (WPT) from a wireless power transmitter (PTx) to a wireless power receiver (PRx) can include: receiving a request to operate according to a particular PLAP; providing one or more transmitter coefficients associated with a model corresponding to the particular PLAP; receiving one or more receiver coefficients associated with the model; receiving an indication of received power associated with the WPT; determining a measured power loss associated with the WPT by comparing the indication of received power from a transmitted wireless power; computing a predicted power loss based on the indication of received power, the one or more transmitter coefficients, the one or more receiver coefficients, and the model; and determining that a foreign object is present if the measured power loss exceeds the predicted power loss by more than a threshold.

17 Claims, 11 Drawing Sheets

(51) Int. Cl.

| | |
|---|---|
| ***H02J 50/10*** | (2016.01) |
| ***H02J 50/70*** | (2016.01) |
| ***H02J 50/80*** | (2016.01) |

(56) References Cited

U.S. PATENT DOCUMENTS

| | | | | |
|---|---|---|---|---|
| 11,329,511 | B2 * | 5/2022 | Partovi | H02J 50/10 |
| 2010/0013322 | A1 * | 1/2010 | Sogabe | H04B 5/266<br>307/104 |
| 2010/0036773 | A1 | 2/2010 | Bennet | |
| 2010/0123430 | A1 * | 5/2010 | Kojima | H02J 7/47<br>320/108 |
| 2010/0315039 | A1 * | 12/2010 | Terao | H01F 38/14<br>320/108 |
| 2013/0094598 | A1 | 4/2013 | Bastami | |
| 2015/0118962 | A1 | 4/2015 | Chu | |
| 2016/0006264 | A1 | 1/2016 | Alperin et al. | |
| 2017/0063161 | A1 * | 3/2017 | Sugiyama | H02J 50/12 |
| 2017/0163074 | A1 * | 6/2017 | Kimura | H02J 50/40 |
| 2017/0294806 | A1 | 10/2017 | Van Wageningen | |
| 2020/0203982 | A1 * | 6/2020 | Liu | H04L 67/306 |
| 2020/0280342 | A1 | 9/2020 | Park | |
| 2020/0373789 | A1 * | 11/2020 | Park | H02J 50/10 |
| 2021/0257864 | A1 | 8/2021 | Stingu et al. | |
| 2022/0166262 | A1 | 5/2022 | Liu | |
| 2022/0320911 | A1 | 10/2022 | Schwartz et al. | |
| 2023/0378822 | A1 * | 11/2023 | AbuKhalaf | H02J 50/10 |
| 2025/0096614 | A1 * | 3/2025 | Ramakrishnan | H02J 50/80 |
| 2025/0096615 | A1 * | 3/2025 | Grabas | H02J 50/60 |

* cited by examiner

800

| | b7 | b6 | b5 | b4 | b3 | b2 | b1 | b0 |
|---|---|---|---|---|---|---|---|---|
| B0 | 1 | | | | RESERVED | | | |
| B1 | RESERVED | | | | | | | |
| B2 | POTEINTAL LOAD POWER | | | | | | | |
| B3 | RESERVED | | | | | | | |
| B4 | NEGOTIABLE LOAD POWER | | | | | | | |
| B5 | RESERVED | | | | POWER LIMT REASON | | | |
| B6 | RESERVED | | DATA STREAM BUFFER SIZE | | | CONCURRENT DATA STREAMS | | |
| B7 | RESERVED | | | | | | | |
| B8 | | | | | | | | |

839

900

| | b7 | b6 | b5 | b4 | b3 | b2 | b1 | b0 |
|---|---|---|---|---|---|---|---|---|
| B0 | RESERVED | | | | | | | |
| B1 | COEFFICIENT 1 | | | | | | | |
| B2 | | | | | | | | |
| B3 | COEFFICIENT 2 | | | | | | | |
| B4 | | | | | | | | |
| B5 | COEFFICIENT 3 | | | | | | | |
| B6 | | | | | | | | |
| B7 | COEFFICIENT 4 | | | | | | | |
| B8 | | | | | | | | |
| B9 | COEFFICIENT 5 | | | | | | | |
| B10 | | | | | | | | |
| B11 | COEFFICIENT 6 | | | | | | | |
| B12 | | | | | | | | |
| B13 | COEFFICIENT 7 | | | | | | | |
| B14 | | | | | | | | |
| B15 | COEFFICIENT 8 | | | | | | | |
| B16 | | | | | | | | |
| B17 | COEFFICIENT 9 | | | | | | | |
| B18 | | | | | | | | |

901 RESPONSES (E.G., FSK RESPONSE FROM PTx):

| | | |
|---|---|---|
| 951 | ACK | PTx ACKNOWLEDGES PACKETS |
| 952 | NAK | NOT ALLOWED |
| 953 | ND | NOT ALLOWED |
| 954 | ATN | NOT ALLOWED |

| | b7 | b6 | b5 | b4 | b3 | b2 | b1 | b0 |
|---|---|---|---|---|---|---|---|---|
| B0 | RESERVED | | | | | | | |
| B1 | RECEIVED POWER | | | | | | | |
| B2 | | | | | | | | |
| B3 | PRECT | | | | | | | |
| B4 | | | | | | | | |
| B5 | VRECT | | | | | | | |
| B6 | | | | | | | | |

1001 RESPONSES (E.G., FSK RESPONSE FROM PTx):

| | | |
|---|---|---|
| 961 | ACK | NO FO |
| 962 | NAK | POSSIBLE FO |
| 963 | ND | NOT ALLOWED |
| 964 | ATN | RENEGOTIATE |

1300

| | b7 | b6 | b5 | b4 | b3 | b2 | b1 | b0 |
|---|---|---|---|---|---|---|---|---|
| B0 | RESERVED | | | | CONFIDENCE | | | |
| B1 | RECEIVED POWER | | | | | | | |
| B2 | | | | | | | | |
| B3 | PRECT | | | | | | | |
| B4 | | | | | | | | |
| B5 | VRECT | | | | | | | |
| B6 | | | | | | | | |
| B7 | RESERVED | | | | IRECT | | | |
| B8 | IRECT | | | | | | | |

1302

CONFIDENCE LEVEL

| VALUE | MEANING | DESCRIPTION |
|---|---|---|
| 0 | LOW | DATA IN PACKET NOT RELIABLE |
| 1 | RESERVED | UNUSED |
| 2 | HIGH | DATA IN PACKET IS RELIABLE |
| 3 | RESERVED | UNUSED |

1301

RESPONSES (E.G., FSK RESPONSE FROM PTx):

| | | |
|---|---|---|
| ACK | NO FO | 1361 |
| NAK | POSSIBLE FO | 1362 |
| ND | NOT ALLOWED | 1363 |
| ATN | RENEGOTIATE | 1364 |

WIRELESS POWER TRANSFER PROFILES

CROSS-REFERENCE TO RELATED APPLICATIONS

This application claims priority to U.S. Provisional Application No. 63/549,731, filed Feb. 5, 2024, entitled "WIRELESS POWER TRANSFER PROFILES," the disclosure of which is incorporated by reference in its entirety for all purposes.

BACKGROUND

Wireless power transfer ("WPT"), such as inductive power transfer ("IPT"), may be used to provide power for charging various battery-powered electronic devices. One application in which WPT has seen increases in use is the consumer electronics space around devices such as mobile phones (i.e., smart phones) and their accessories (e.g., wireless earphones, smart watches, etc.) as well as tablets and other types of portable computers and their accessories (e.g., styluses, etc.).

SUMMARY

A method, performed by control circuitry of a wireless power transmitter, for negotiating a power loss accounting profile for detecting a foreign object influenced by an electromagnetic field associated with wireless power transfer from the wireless power transmitter to a wireless power receiver, can include: receiving from the wireless power receiver a request to operate according to a particular power loss accounting profile; providing one or more transmitter coefficients associated with a model corresponding to the particular power loss accounting profile to the wireless power receiver; receiving from the wireless power receiver one or more receiver coefficients associated with the model corresponding to the particular power loss accounting profile; receiving from the wireless power receiver an indication of received power associated with the wireless power transfer; determining a measured power loss associated with the wireless power transfer by comparing the indication of received power from a transmitted wireless power measured by the wireless power transmitter; computing a predicted power loss based on the indication of received power, the one or more transmitter coefficients, the one or more receiver coefficients, and the model corresponding to the particular power loss accounting profile; determining that a foreign object is present if the measured power loss exceeds the predicted power loss by more than a threshold; and if a foreign object is present, mitigating presence of the foreign object by reducing a power level of or suspending the wireless power transfer.

The particular power loss accounting profile can include a model of the wireless power transfer system defined by one or more equations and the one or more coefficients and defines the format and content of messages for communications between wireless power transmitter and wireless power receiver. The messages can include: a power profile selection message including an identifier representing the particular power loss accounting profile; and a definition of allowed and disallowed responses to the power profile selection message. The messages can include a capability indication message specifying a power limit associated with the particular power loss accounting profile and reason for the power limit. The messages can include: a coefficient transfer message including one or more coefficients associated with the model; and a definition of allowed and disallowed responses to the coefficient transfer message. The messages can include: a power reporting message indicating at least a received power measurement; and a definition of allowed and disallowed responses to the power reporting message. The power reporting message can also include at least one of: a rectifier power and rectifier voltage corresponding to the received power measurement; a confidence level in the received power measurement; and a rectifier current measurement.

The power loss accounting profile can define at least one of: timings associated with power measurement windows or intervals and timers specifying the frequency of power measurements and timeouts associated with failure to receive an appropriate message; and behaviors specifying actions to be taken by the wireless power transmitter or wireless power receiver under various operating condition.

A wireless power transmitter can include: a wireless power transmitter coil configured to magnetically couple to a wireless power receiver coil of a wireless power receiver to wirelessly transfer power to the wireless power receiver; an inverter configured to receive input power and generate an output that drives the wireless power transmitter coil; and controller and communication circuitry coupled to the inverter and the wireless power transmitter coil that controls the inverter to regulate wireless power transfer to the wireless power receiver. The controller and communication circuitry can include logic or programming for negotiating a power loss accounting profile for detecting a foreign object influenced by an electromagnetic field associated with wireless power transfer from the wireless power transmitter to the wireless power receiver by: receiving from the wireless power receiver a request to operate according to a particular power loss accounting profile; providing one or more transmitter coefficients associated with a model corresponding to the particular power loss accounting profile to the wireless power receiver; receiving from the wireless power receiver one or more receiver coefficients associated with the model corresponding to the particular power loss accounting profile; receiving from the wireless power receiver an indication of received power associated with the wireless power transfer; determining a measured power loss associated with the wireless power transfer by subtracting the indication of received power from a transmitted wireless power measured by the wireless power transmitter; computing a predicted power loss based on the indication of received power, the one or more transmitter coefficients, the one or more receiver coefficients, and the model corresponding to the particular power loss accounting profile; and determining that a foreign object is present if the measured power loss exceeds the predicted power loss by more than a threshold. The controller and communication circuitry can further include logic or programming that, if a foreign object is present, mitigates presence of the foreign object by reducing a power level of or suspending the wireless power transfer.

The particular power loss accounting profile can include a model of the wireless power transfer system defined by one or more equations and the one or more coefficients. The power loss accounting profile can define the format and content of messages for communications between wireless power transmitter and wireless power receiver. The messages can include: a power profile selection message including an id of the particular power loss accounting profile; and a definition of allowed and disallowed responses to the power profile selection message. The messages can include a capability indication message specifying a power limit associated with the particular power loss accounting profile and reason for the power limit. The messages can include: a coefficient transfer message including one or more coefficients associated with the model; and a definition of allowed and disallowed responses to the coefficient transfer message. The messages can include: a power reporting message indicating at least a received power measurement; and a definition of allowed and disallowed responses to the power reporting message. The power reporting message can also include at least one of: a rectifier power and rectifier voltage corresponding to the received power measurement; a confidence level in the accuracy of the received power measurement; and a rectifier current measurement.

The power loss accounting profile can define at least one of: timings associated with power measurement windows or intervals and timers specifying the frequency of power measurements and timeouts associated with failure to receive an appropriate message; and actions to be taken by the wireless power transmitter or wireless power receiver under various operating conditions.

A wireless power receiver can include: a wireless power receiver coil configured to magnetically couple to a wireless power transmitter coil of a wireless power transmitter to wirelessly receive power from the wireless power transmitter; a rectifier configured to receive input power and generate an output that drives a load; and controller and communication circuitry coupled to the rectifier and the wireless power receiver coil. The controller and communication circuitry can include logic or programming for negotiating a power loss accounting profile for detecting a foreign object influenced by an electromagnetic field associated with wireless power transfer from the wireless power transmitter to the wireless power receiver by: transmitting to the wireless power transmitter a request to operate according to a particular power loss accounting profile; receiving one or more transmitter coefficients associated with a model corresponding to the particular power loss accounting profile from the wireless power transmitter; transmitting to the wireless power transmitter one or more receiver coefficients associated with the model corresponding to the particular power loss accounting profile; and transmitting to the wireless power transmitter an indication of received power associated with the wireless power transfer.

The particular power loss accounting profile includes a model of the wireless power transfer system defined by one or more equations and the one or more coefficients. The power loss accounting profile can define the format and content of messages for communications between wireless power transmitter and wireless power receiver. The messages can include: a power profile selection message including an id of the particular power loss accounting profile; and a definition of allowed and disallowed responses to the power profile selection message. The messages can include a capability indication message specifying a power limit associated with the particular power loss accounting profile and reason for the power limit. The messages can include: a coefficient transfer message including one or more coefficients associated with the model; and a definition of allowed and disallowed responses to the coefficient transfer message. The messages can include: a power reporting message indicating at least a received power measurement; and a definition of allowed and disallowed responses to the power reporting message. The power reporting message can also include at least one of: a rectifier power and rectifier voltage corresponding to the received power measurement; a confidence level in the accuracy of the received power measurement; and a rectifier current measurement.

The power loss accounting profile can define at least one of: timings associated with power measurement windows or intervals and timers specifying the frequency of power measurements and timeouts associated with failure to receive an appropriate message; and behaviors specifying actions to be taken by the wireless power transmitter or wireless power receiver under various operating conditions.

BRIEF DESCRIPTION OF THE DRAWINGS

FIG. 9 illustrates an exemplary coefficient transfer packet associated with a power loss accounting profile.

DETAILED DESCRIPTION

Figure 1:
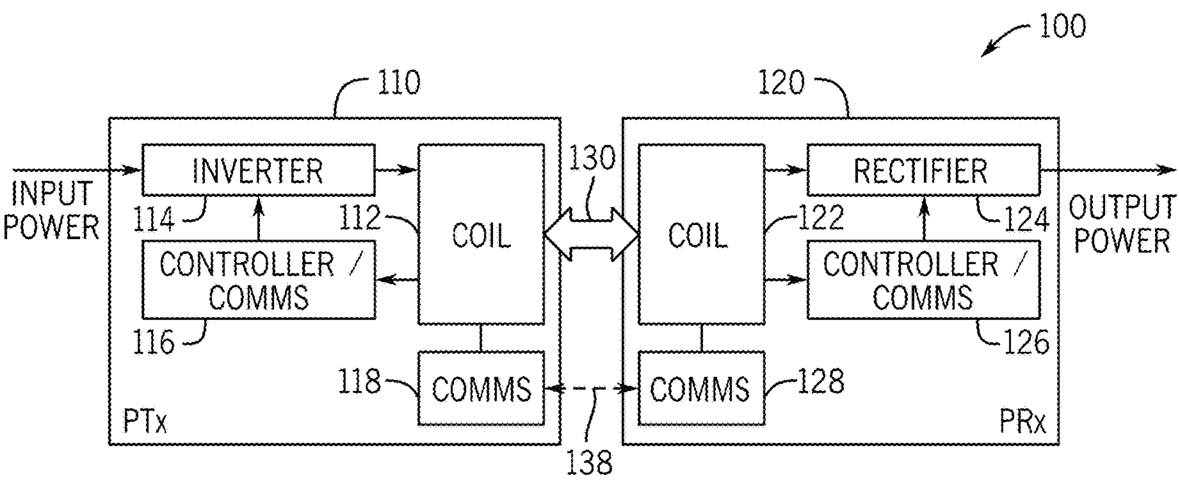
FIG. 1 illustrates a block diagram of a wireless power transfer system.

In the following description, for purposes of explanation, numerous specific details are set forth to provide a thorough understanding of the disclosed concepts. As part of this description, some of this disclosure's drawings represent structures and devices in block diagram form for sake of simplicity. In the interest of clarity, not all features of an actual implementation are described in this disclosure. Moreover, the language used in this disclosure has been selected for readability and instructional purposes, has not been selected to delineate or circumscribe the disclosed subject matter. Rather the appended claims are intended for such purpose.

Various embodiments of the disclosed concepts are illustrated by way of example and not by way of limitation in the accompanying drawings in which like references indicate similar elements. For simplicity and clarity of illustration, where appropriate, reference numerals have been repeated among the different figures to indicate corresponding or analogous elements. In addition, numerous specific details are set forth to provide a thorough understanding of the implementations described herein. In other instances, methods, procedures, and components have not been described in detail so as not to obscure the related relevant function being described. References to "an," "one," or "another" embodiment in this disclosure are not necessarily to the same or different embodiment, and they mean at least one. A given figure may be used to illustrate the features of more than one embodiment, or more than one species of the disclosure, and not all elements in the figure may be required for a given embodiment or species. A reference number, when provided in a given drawing, refers to the same element throughout the several drawings, though it may not be repeated in every drawing. The drawings are not to scale unless otherwise indicated, and the proportions of certain parts may be exaggerated to better illustrate details and features of the present disclosure.

FIG. 1 illustrates a simplified block diagram of a wireless power transfer system 100. Wireless power transfer system includes a power transmitter (PTx) 110 that transfers power to a power receiver (PRx) 120 wirelessly, such as via inductive coupling 130. Power transmitter 110 may receive input power that is converted to an AC voltage having particular voltage and frequency characteristics by an inverter 114. Inverter 114 may be controlled by a controller/communications module 116 that operates as further described below. In various embodiments, the inverter controller and communications module may be implemented in a common system, such as a system based on a microprocessor, microcontroller, or the like. In other embodiments, the inverter controller may be implemented by a separate controller module and communications module that have a means of communication between them. Inverter 114 may be constructed using any suitable circuit topology (e.g., full bridge, half bridge, etc.) and may be implemented using any suitable semiconductor switching device technology (e.g., MOSFETs, IGBTs, etc. made using silicon, silicon carbide, or gallium nitride devices).

Inverter 114 may deliver the generated AC voltage to a transmitter coil 112. In addition to a wireless coil allowing magnetic coupling to the PRx, the transmitter coil block 112 illustrated in FIG. 1 may include tuning circuitry, such as additional inductors and capacitors, that facilitate operation of the PTx in different conditions, such as different degrees of magnetic coupling to the PRx, different operating frequencies, etc. The wireless coil itself may be constructed in a variety of different ways. In some embodiments, the wireless coil may be formed as a winding of wire around a suitable bobbin. In other embodiments, the wireless coil may be formed as traces on a printed circuit board. In still other embodiments, the wireless coil may be a flat wound coil or an air coil. Other arrangements are also possible and may be used in conjunction with the various embodiments described herein. The wireless transmitter coil may also include a core of magnetically permeable material (e.g., ferrite) dimensioned and positioned to affect the flux pattern of the coil in a way suitable to the particular application. The teachings herein may be applied in conjunction with any of a wide variety of transmitter coil arrangements appropriate to a given application.

PTx controller/communications module 116 may monitor the transmitter coil and use information derived therefrom to control the inverter 114 as appropriate for a given situation. For example, controller/communications module may be configured to cause inverter 114 to operate at a given frequency or output voltage depending on the particular application. In some embodiments, the controller/communications module may be configured to receive information from the PRx device and control inverter 114 accordingly. This information may be received via the power transmission coils (i.e., in-band communication) or may be received via a separate communications channel (not shown, i.e., out-of-band communication). For in-band communication, controller/communications module 116 may detect and decode signals imposed on the magnetic link (such as voltage, frequency, or load variations) by the PRx to receive information and may instruct the inverter to modulate the delivered power by manipulating various parameters of the generated voltage (such as voltage, frequency, etc.) to send information to the PRx. In some embodiments, controller/communications module may be configured to employ frequency shift keying (FSK) communications, in which the frequency of the inverter signal is modulated, to communicate data to the PRx. Controller/communications module 116 may be configured to detect amplitude shift keying (ASK) communications or load modulation based communications from the PRx. In either case, the controller/communications module 126 may be configured to vary the impedance of the PRx to manipulate the waveform seen on the Tx coil to deliver information to from the PRx to the PTx. For out-of-band communication, additional modules that allow for communication between the PTx and PRx may be provided, for example, WiFi, Bluetooth, infrared (IR) or other radio/light links or any other suitable communications channel.

As mentioned above, controller/communications module 116 may be a single module, for example, provided on a single integrated circuit, or may be constructed from multiple modules/devices provided on different integrated circuits or a combination of integrated and discrete circuits having both analog and digital components. The teachings herein are not limited to any particular arrangement of the controller/communications circuitry.

PTx device 110 may optionally include other systems and components, such as a separate communications module 118. In some embodiments, comms module 118 may communicate with a corresponding module tag in the PRx via the power transfer coils. In other embodiments, comms module 118 may communicate with a corresponding module using a separate physical channel 138.

As noted above, wireless power transfer system also includes a wireless power receiver (PRx) 120. Wireless power receiver can include a receiver coil 122 that may be magnetically coupled 130 to the transmitter coil 112. As with transmitter coil 112 discussed above, receiver coil block 122 illustrated in FIG. 1 may include tuning circuitry, such as additional inductors and capacitors, that facilitate operation of the PTx in different conditions, such as different degrees of magnetic coupling to the PRx, different operating frequencies, etc. The wireless coil itself may be constructed in a variety of different ways. In some embodiments, the wireless coil may be formed as a winding of wire around a suitable bobbin. In other embodiments, the wireless coil may be formed as traces on a printed circuit board. Other arrangements are also possible and may be used in conjunction with the various embodiments described herein. The wireless receiver coil may also include a core of magnetically permeable material (e.g., ferrite) configured to affect the flux pattern of the coil in a way suitable to the particular application. The teachings herein may be applied in conjunction with any of a wide variety of receiver coil arrangements appropriate to a given application.

Receiver coil 122 outputs an AC voltage induced therein by magnetic induction via transmitter coil 112. This output AC voltage may be provided to a rectifier 124 that provides a DC output power to one or more loads associated with the PRx device. Rectifier 124 may be controlled by a controller/communications module 126 that operates as further described below. In various embodiments, the rectifier controller and communications module may be implemented in a common system, such as a system based on a microprocessor, microcontroller, or the like. In other embodiments, the rectifier controller may be implemented by a separate controller module and communications module that have a means of communication between them. Rectifier 124 may be constructed using any suitable circuit topology (e.g., full bridge, half bridge, etc.) and may be implemented using any suitable semiconductor switching device technology (e.g., MOSFETs, IGBTs, etc. made using silicon, silicon carbide, or gallium nitride devices).

PRx controller/communications module 126 may monitor the receiver coil and use information derived therefrom to control the rectifier 124 as appropriate for a given situation. For example, controller/communications module may be configured to cause rectifier 124 to operate provide a given output voltage depending on the particular application. In some embodiments, the controller/communications module may be configured to send information to the PTx device to effectively control the power delivered to the PRx. This information may be received sent via the power transmission coils (i.e., in-band communication) or may be sent via a separate communications channel (not shown, i.e., out-of-band communication). For in-band communication, controller/communications module 126 may, for example, modulate load current or other electrical parameters of the received power to send information to the PTx. In some embodiments, controller/communications module 126 may be configured to detect and decode signals imposed on the magnetic link (such as voltage, frequency, or load variations) by the PTx to receive information from the PTx. In some embodiments, controller/communications module 126 may be configured to receive frequency shift keying (FSK) communications, in which the frequency of the inverter signal has been modulated to communicate data to the PRx. Controller/communications module 126 may be configured to generate amplitude shift keying (ASK) communications or load modulation based communications from the PRx. In either case, the controller/communications module 126 may be configured to vary the current drawn by the PRx to manipulate the waveform seen on the Tx coil to deliver information to from the PRx to the PTx. For out-of-band communication, additional modules that allow for communication between the PTx and PRx may be provided, for example, WiFi, Bluetooth, or other radio links or any other suitable communications channel.

As mentioned above, controller/communications module 126 may be a single module, for example, provided on a single integrated circuit, or may be constructed from multiple modules/devices provided on different integrated circuits or a combination of integrated and discrete circuits having both analog and digital components. The teachings herein are not limited to any particular arrangement of the controller/communications circuitry.

PRx device 120 may optionally include other systems and components, such as a communications ("comms") module 128. In some embodiments, comms module 128 may communicate with a corresponding module in the PTx via the power transfer coils. In other embodiments, comms module 128 may communicate with a corresponding module or tag using a separate physical channel 138.

Numerous variations and enhancements of the above-described wireless power transmission system 100 are possible, and the following teachings are applicable to any of such variations and enhancements.

Figure 2A:
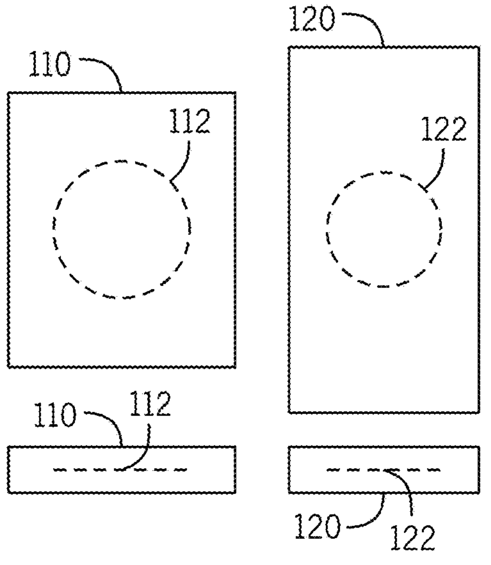
FIGS. 2A-2B illustrate a physical configuration of a wireless power transfer system.

Wireless power transfer as described above depends on the degree of electromagnetic coupling between the PTx and the PRx. For example, in inductive charging systems, the transmitter coil 112 and the receiver coil 122 may be thought of as a loosely coupled transformer. As such, the relative position of the PTx and PRx can affect the degree of magnetic coupling between the PTx and PRx, which, in turn, can affect the power transfer capability of the system. FIG. 2A illustrates a simplified diagram of a PTx (110)-PRx (120) system. Both devices are illustrated in plan view (upper part of the diagram) and an edge-on section view (lower part of the diagram). PTx device 110 includes transmitter coil 112, and PRx device 120 includes a receiver coil 122. In some embodiments, PTx device 110 may be a wireless charging pad, mat, or stand (or other wireless power transfer device), and PRx device 120 may be a mobile phone, tablet computer, smart watch, (or other wireless power receiver device). Although the respective devices are depicted as generally rectangular in shape with generally circular charging coils, it is to be appreciated that other configurations are also possible.

Figure 2B:
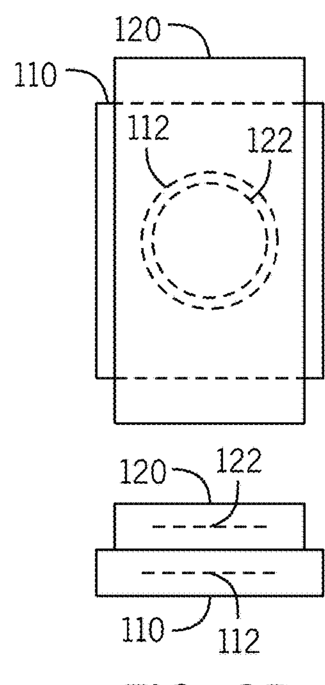

FIG. 2B illustrates the PTx 110 and PRx 120 in a power transfer position. In FIG. 2B, the devices are horizontally aligned (as depicted in the plan view) and vertically aligned and as close as possible (as illustrated in the sectional view). In this context, horizontal and vertical are merely used as terms of convenience, and the true orientation of the system may vary, and the following description is applicable to a system in any such orientation, although "horizontal" and "vertical" will continue to be used for contextual clarity.

As a practical matter, PTx and PRx devices operate with some degree of independence, even though they must also interoperate. To that end, various "standardized" modes of operation may be defined with each device having one or more operating modes. In some cases, these modes may be part of an industry standard, allowing devices from any manufacturer to operate with devices from any other manufacturer. In other cases, devices from a single manufacturer (or a single manufacturer and its partners) may operate according to a non-public (i.e., proprietary) standard that allows interoperation only between devices from that manufacturer (and its partners). In some cases, devices may be capable of operating according to both a published industry standard (or multiple published industry standards) and a proprietary standard (or multiple proprietary standards). In any case, heretofore, each device may have made certain inferences about the current state of its counterpart device, based on things like timing, packet counting, transmitted power level. However, it would be desirable to define a mechanism by which PTx and PRx devices can explicitly specify their current operating mode/state to a counterpart device. Disclosed below are various mechanisms allowing for such an exchange. More specifically, the following defines various profiles (corresponding to operating modes or states) and messaging protocols for exchanging such profile information.

Figure 3:
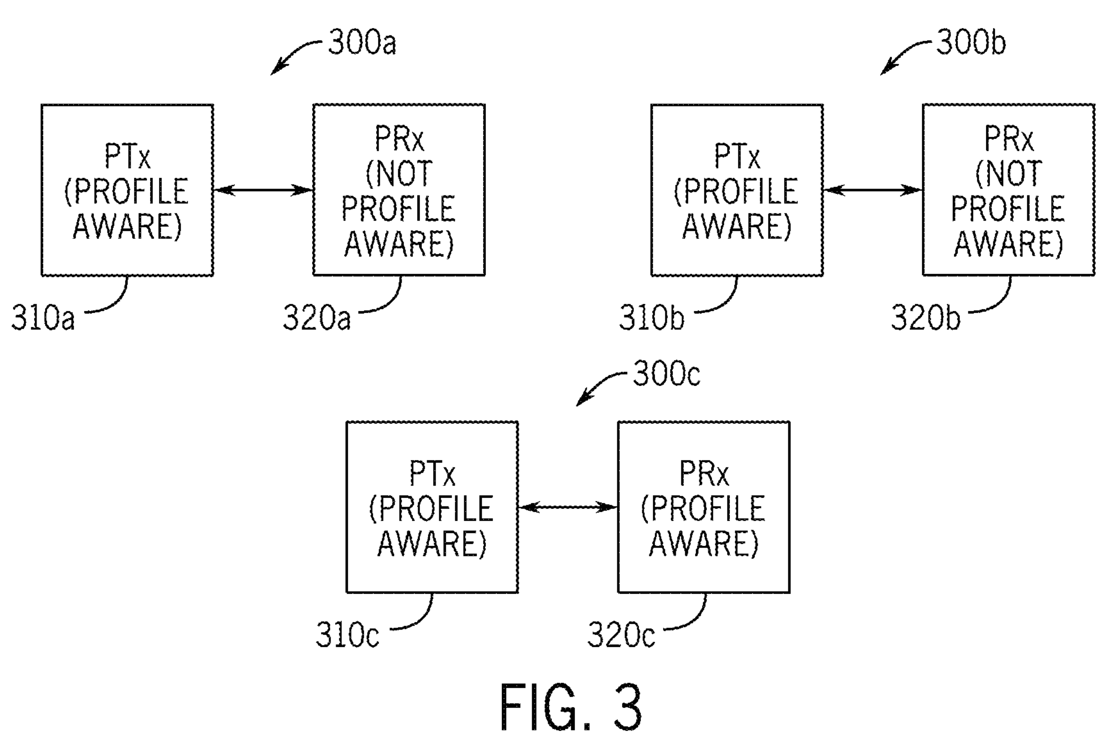
FIG. 3 illustrates various combinations of profile aware and not profile aware PTx and PRx devices.

As it may be desirable for wireless power transfer devices to interoperate with other wireless power transfer devices that operate according to a different standard (whether public or proprietary), in some cases, a device incorporating the profile communication techniques described herein may interoperate with a corresponding device that is not so capable. For example, in FIG. 3 view 300*a*, a PTx 310*a* that is profile aware (i.e., configured to establish and communicate power profiles as described herein) may interoperate with a PRx 320*a* that is not profile aware. Alternatively, in FIG. 3 view 300*b*, a PTx 310*b* that is not profile aware may interoperate with a PRx 320*b* that is profile aware. Finally, in FIG. 3 view 300*c*, the PTx 310*c* and PRx 320*c* may both be profile aware. Thus, profile aware devices may be configured to exchange profile information with a counterpart device in a way that allows for improved operation by way of counterpart device state awareness when both devices are profile aware, but otherwise does not interfere with interoperation according to an alternative non-profile aware standard/mode of operation if the counterpart device is not profile aware.

To facilitate profile aware interoperation of wireless power transfer devices, various logical profiles may be defined. Additional profiles may also be defined. These profiles may correspond to various operating states of a wireless power transfer device, including states that exist in present wireless power transfer systems and standards or new states that may be applicable only to certain devices. In any case, behaviors for both PTx and PRx devices can be defined for each of the profiles/states.

To further facilitate profile aware interoperation of wireless power transfer devices, a messaging protocol can be defined to allow the respective devices to communicate their mode/state to each other and/or to request that the counterpart device switch to a different state. For example, messages to request or activate a certain profile, inquire as to a device's active profile, respond to the aforementioned messages, or momentarily pause power transfer may be defined. Illustrative examples of such messages and their usage are discussed in greater detail below. It may be preferable that such messages be incorporated into a standard, such as a public industry standard, to allow devices to take advantage of these enhancements.

As discussed above with respect to FIG. 3, interoperability between profile aware and non-profile aware devices may be desirable. In some cases, PTx and PRx devices may prefer to start in a predefined mode defined by an industry standard. Profile aware devices may thus be designed (i.e., configured or programmed) to operate in a backward compatible mode when they are engaged with a non-profile aware device. During the initiation phases, the devices can determine whether the counterpart device is profile aware using a predefined exchange of messages and analyzing the received responses. In general, this will require the profile aware device to operate according to a non-profile aware mode (e.g., a mode defined by an industry standard) if the corresponding device is not profile aware.

Further details of exemplary wireless power transfer profiles are described in Applicant's co-pending U.S. patent application Ser. No. 18/192,183, entitled "Wireless Power Transfer Profiles," filed Mar. 29, 2023, which is hereby incorporated by reference in its entirety. An additional use case in which wireless power transfer profiles may be employed relates to power loss accounting. Power loss accounting can be employed for foreign object detection in wireless power transfer systems. More specifically, a difference between power transmitted by a PTx device and power received by a PRx device can correspond to power absorbed by a foreign object, which can call for a reduction of transferred power or a cessation of wireless power transfer to protect the foreign object. Exemplary power loss accounting techniques are described in Applicant's co-pending U.S. Provisional Patent Application 63/583,001, entitled "Power Transfer Accounting for Wireless Power Transfer," filed Sep. 15, 2023, which is hereby incorporated by reference in its entirety. As described therein, wireless power transfer systems can use wireless power transfer system models (characterized by various equations) that employ certain coefficients corresponding to the physical properties of a particular wireless power transmitter and receiver to model an expected power loss associated with the PTx-PRx pair for various power transfer levels. Should the actual power losses at a given power transfer level exceed the expected power loss predicted by the model, then the presence of a foreign object can be inferred, and corresponding action can be taken, as appropriate. The foregoing high-level summary of power loss accounting is provided for context, and further details can be understood by review of the application incorporated by reference above.

In any case, power loss accounting techniques may be improved over time to allow for improved power transfer at higher power levels. Such improvements may lead to the use of new models, equations, coefficients, or a new set of actions, protocol sequences, etc. Thus, to manage different power loss accounting techniques and allow for interoperability between various PTx and PRx devices, which may support various and potentially differing wireless power loss accounting techniques, power loss accounting profiles can be provided that distinguish between different power loss accounting techniques and allow for selection of an appropriate power loss accounting technique for a given situation (PTx device, PRx device, power transfer level, etc.) and/or for a change in power loss accounting technique as appropriate. To that end, a power loss accounting profile 400 is conceptually illustrated in FIG. 4.

Figure 4:
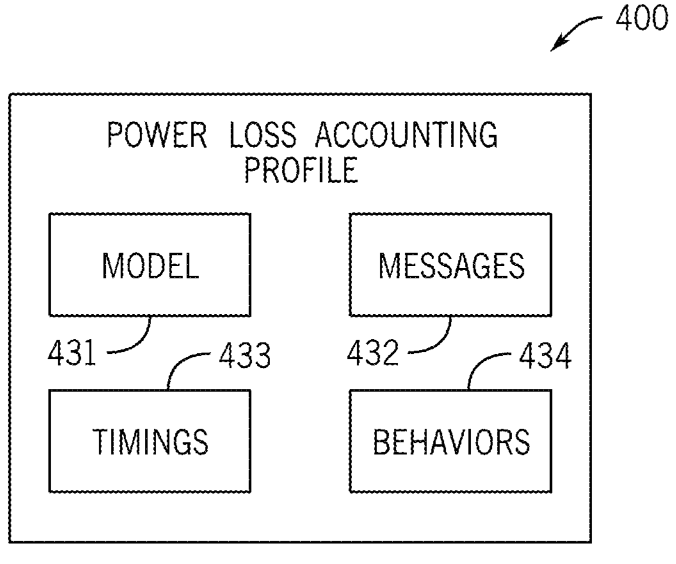
FIG. 4 is a conceptual depiction of a power loss accounting profile.

As illustrated in FIG. 4, the power loss accounting profile 400 can include a power loss accounting model 431, which can include or define appropriate equations characterizing the model, coefficients associated with the model (including coefficients corresponding to a PTx and/or PRx device), an accuracy level associated with the model, a maximum power level supported by the model, etc. The power loss accounting profile can also include or define messages 432 defining the format and content of messages for exchanging coefficients associated with the model between PTx and PRx, reporting power levels (either transmitted by PTx and/or received by PRx), foreign object detection/status, etc. The power loss accounting profile 400 can also include timings 433 associated with power measurement windows or intervals as well as timers specifying the frequency of power measurements (in either direction) and timeouts associated with failure to receive an appropriate message. The power loss accounting profile 400 can also include behaviors 434 defining actions to be taken by the PTx and/or PRx device under various operating condition, such as when the system is in a normal operation condition and/or when a foreign object is detected. Data and algorithms corresponding to the power loss accounting profile and its above-described components may be stored in a memory associated with the PTx and/or PRx devices and may be executed or operated on by a processing device associated with the PTx and/or PRx devices, such as controller/communications modules 116 and 118 described above.

Figure 5A:
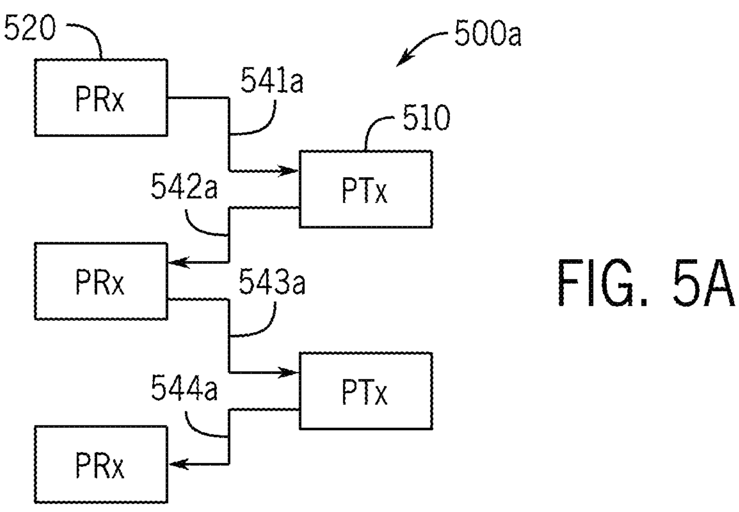
FIGS. 5A-5C illustrate exemplary communication sequences (messages) for establishing an agreed power loss accounting profile.
Figure 5B:
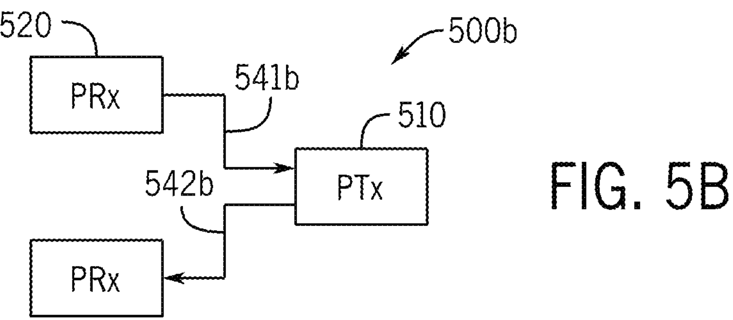
Figure 5C:
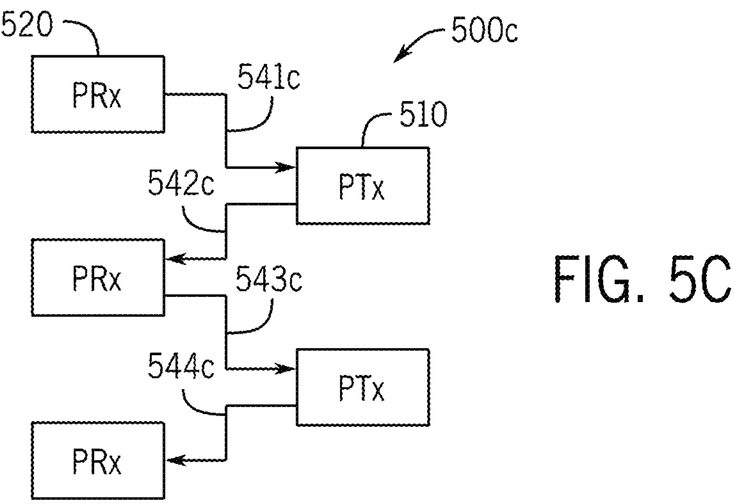

FIGS. 5A-5C illustrate exemplary communication sequences (messages) for establishing an agreed power loss accounting profile. More specifically, FIG. 5A illustrates a first exemplary communication sequence in which a wireless power receiver (PRx 520) sends a message **541*a* to a wireless power transmitter (PTx 510). Message 541*a* can be a request for the PTx to provide a list of power loss accounting profiles supported by PTx. PTx 510 can respond to PRx 520 with a response message 542*a* providing such a list of supported power loss accounting profiles. In response to this message, PRx 520 can send a message 543*a* to PTx 510 selecting one of the supported power loss accounting profiles. PTx 510 can then send a message 544*a*** acknowledging this selection, allowing the PTx and PRx to then exchange appropriate parameters, etc. as described in greater detail below. The above-described messages can have any desirable format that is understandable by the respective PRx and PTx devices, and exemplary message formats are described in greater detail below.

Alternatively, FIG. 5B illustrates a second exemplary communication sequence in which a wireless power receiver (PRx 520) sends a message 541*b* to a wireless power transmitter (PTx 510). Message 541*b* can be a request to the PTx to activate a power loss accounting profile. If PTx 510 supports the requested power loss accounting profile, it can respond to PRx 520 with a response message 542*b* acknowledging this selection, allowing the PTx and PRx to then exchange appropriate parameters, etc. as described in greater detail below. The above-described messages can have any desirable format that is understandable by the respective PRx and PTx devices, and exemplary message formats are described in greater detail below.

As another alternative, FIG. 5C illustrates a third exemplary communication sequence in which a wireless power receiver (PRx 520) sends a message 541*c* to a wireless power transmitter (PTx 510). Message 541*c* can be a request for the PTx to activate a power loss accounting profile. If PTx 510 does not support requested profile, PTx 510 can respond to PRx 520 with a response message 542*c* that is a "not acknowledged" or "NAK" message. In response to this message, PRx 520 can send a message 543*c* to PTx 510 requesting an alternative power loss accounting profile. If PTx 510 supports this alternative power loss accounting profile, PTx 510 can then send a message 544*c* acknowledging this selection, allowing the PTx and PRx to then exchange appropriate parameters, etc. as described in greater detail below. Alternatively, if the second requested power loss accounting profile is also not supported, a NAK response can be sent in message 544*c*, and the process can continue until a mutually supported power loss accounting profile is found or until the devices resort to a wireless power transfer regime with a default or baseline power loss accounting profile. (It should be noted that this latter case may result in lower maximum power transfer levels being provided than with other power loss accounting profiles.) The above-described messages can have any desirable format that is understandable by the respective PRx and PTx devices, and exemplary message formats are described in greater detail below.

Figure 6A:
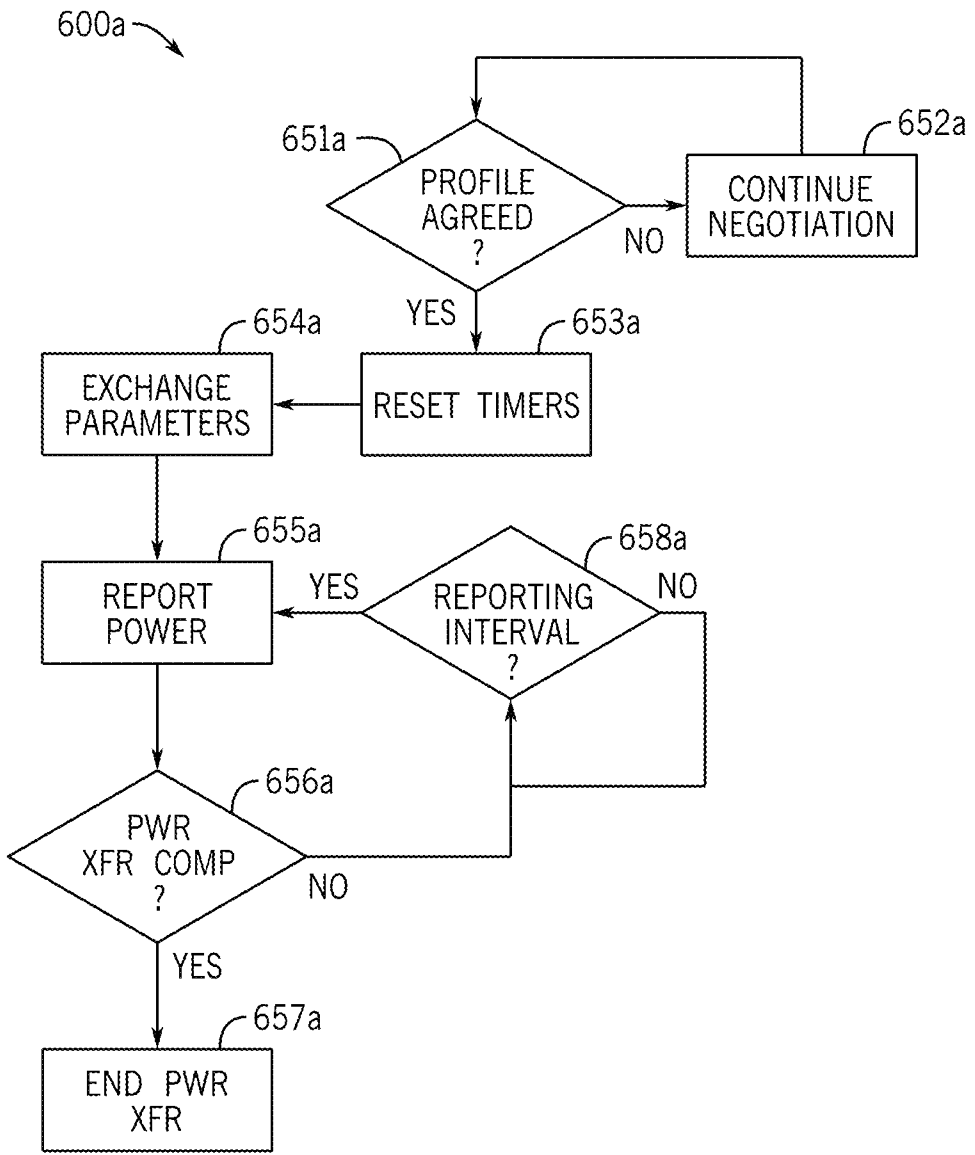
FIGS. 6A-6B illustrate exemplary behaviors associated with a power loss accounting profile.
Figure 6B:
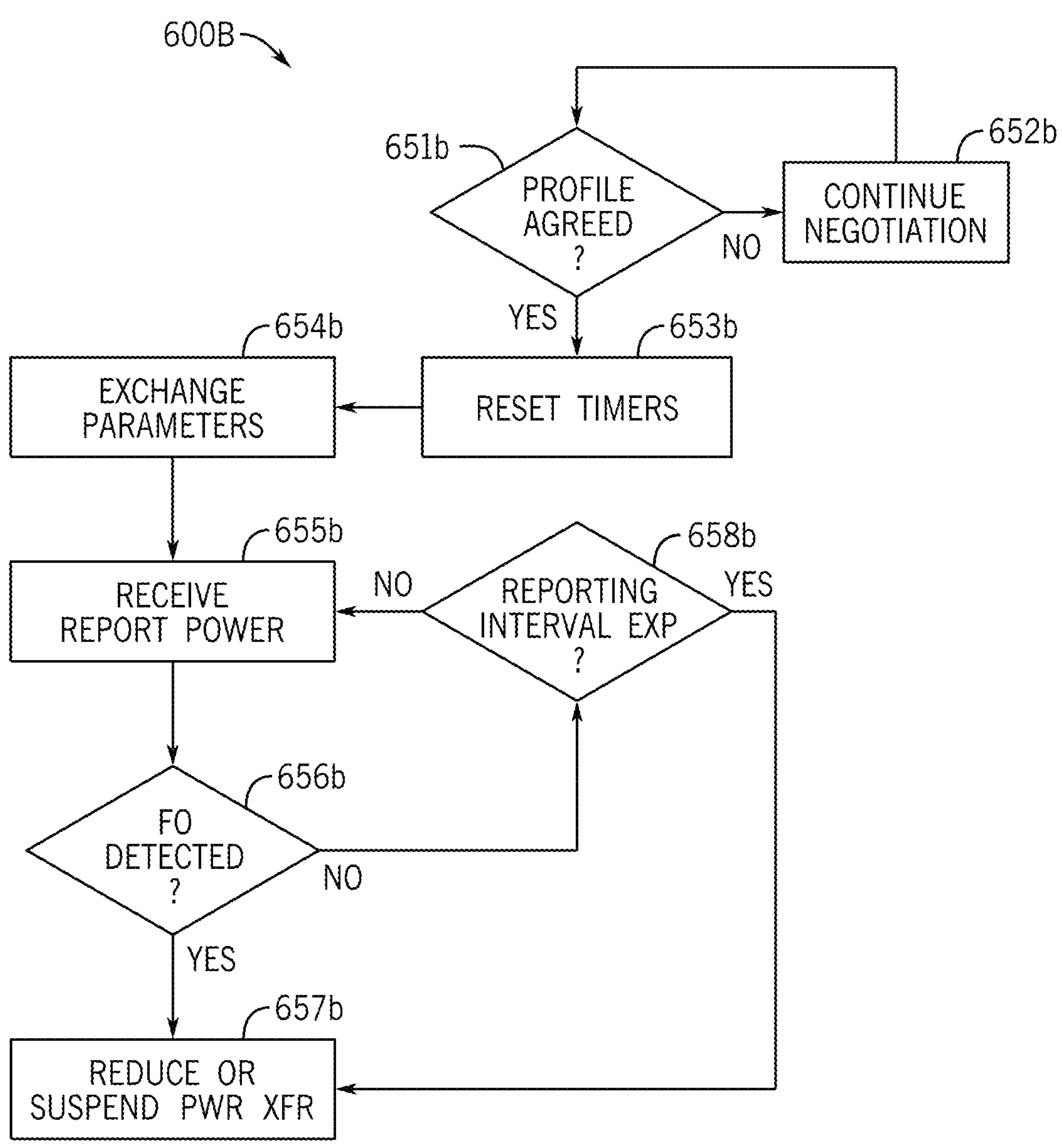

FIGS. 6A-6B illustrate exemplary behaviors associated with a power loss accounting profile. More specifically, FIG. 6A depicts a flowchart 600*a* illustrating the power loss accounting profile selection and power reporting process. The process can be performed by a PTx device or by a PRx device, and the illustrated actions may be performed by controller/communication circuitry associated with such devices as described above. The illustrated actions may be performed in different orders than those illustrated, additional actions may be included, or, in some cases, actions may be omitted. In the illustrated example, block 651*a* corresponds to an agreement between PTx and PRx as to the power loss accounting profile to be used. If agreement has not been reached, power loss profile negotiation can continue in block 652*a*. Once agreement is reached, the device (either PTx or PRx) can reset the various timers associated with operation (block 653*a*). As described above with reference to FIG. 4, there may be various timers and timings associated with a power loss accounting profile and each device, whether PTx or PRx, should reset such timers to ensure that they are starting from a similar reference state with respect to such timers. Then in block 654*a*, the device(s) can exchange parameters (e.g., coefficients) associated with the model and associated equations or other necessary data. This exchange can involve both sending parameters and receiving parameters and can be performed by either or both devices. This can allow for power transfer operation and periodic power level reporting as described in greater detail below.

In block 655*a*, a device can report its power level to its counterpart device. In some embodiments, this can include the PTx reporting the transmitted power to the PRx. In some embodiments, this can include the PRx reporting the received power to the PTx. In some embodiments, such power levels can be reported by either/both devices in either/both directions. In some embodiments, the power reports can additionally or alternatively include related parameters, such as voltages, currents, etc. In any case, the device receiving a power report from its counterpart can compare the difference between the reported power and the received or transmitted power (e.g., by subtraction). A difference between the two power levels or values exceeding a threshold can indicate the potential presence of a foreign object, which can allow for mitigation such as reducing transmitted power and/or ceasing power transfer according to various rules, etc.

In block 656*a*, the device can determine whether power transfer is complete, and, if so, power transfer can be ended (block 657*a*). Otherwise, if power transfer is not complete, in block 658*a*, the device can determine whether a reporting interval has elapsed (block 658*a*). The power reporting interval can be specified by the agreed power profile selected in block 651. In either case, if the reporting interval has not elapsed, the device can wait until it has, at which point a power level can again be reported (block 655*a*), and the process can continue until power transfer is completed.

FIG. 6B depicts a flowchart 600*b* illustrating further aspects of the power loss accounting profile selection and power reporting process. The process can be performed by a PTx device or by a PRx device, and the illustrated actions may be performed by controller/communication circuitry associated with such devices as described above. The illustrated actions may be performed in different orders than those illustrated, additional actions may be included, or, in some cases, actions may be omitted. In the illustrated example, block 651*b* corresponds to an agreement between PTx and PRx as to the power loss accounting profile to be used. If agreement has not been reached, power loss profile negotiation can continue in block 652*b*. Once agreement is reached, the device (either PTx or PRx) can reset the various timers associated with operation (block 653*b*). As described above with reference to FIG. 4, there may be various timers and timings associated with a power loss accounting profile and each device, whether PTx or PRx, should reset such timers to ensure that they are starting from a similar reference state with respect to such timers. Then in block 654*b*, the device(s) can exchange parameters (e.g., coefficients) associated with the model and associated equations or other necessary data. This exchange can involve both sending parameters and receiving parameters and can be performed by either or both devices. This can allow for power transfer operation and periodic power level reporting as described in greater detail below.

In block 655*b*, a device can receive a power report from its counterpart device; the power report being provided as described above with respect to FIG. 6A. In some embodiments, this can include the PTx receiving a received power report the PRx. In some embodiments, this can include the PRx receiving a transmitted power report from the PTx. In some embodiments, such power levels can be reported by either/both devices in either/both directions. In some embodiments, the power reports can additionally or alternatively include related parameters, such as voltages, currents, etc. In any case, the device receiving a power report from its counterpart can compare the difference between the reported power and the received or transmitted power. A difference between the two power levels or values exceeding a threshold can indicate the potential presence of a foreign object, which can allow for mitigation such as reducing transmitted power and/or ceasing power transfer according to various rules, etc. Thus, in block 656*b*, a device can determine whether a foreign object is present, based on the difference between the local device's power (transmitted or received) and the power report received from the counterpart device. If a foreign object is detected, power transfer can be reduced or suspended (block 657*b*). This reduction or suspension of power transfer can thus mitigate the presence of a foreign object.

Otherwise, if in block 656*b*, no foreign object is detected, the device can determine whether the reporting interval has expired (block 658*b*). The reporting interval can be one of the timers corresponding to the agreed power transfer accounting profile selected in block 651*b*, with a corresponding timer being set/reset in block 653*b*. If the reporting interval has expired, then power transfer can again be reduced or suspended, as the lack of communication may be indicative of a removal or non-responsiveness of the counterpart device, suggesting that power transfer should be reduced or suspended (or other mitigation applied, as appropriate). Alternatively, if the reporting interval has not expired, the device can continue to receive power reports (block 655*b*), with operation otherwise proceeding as described above.

Figures 7, 8:
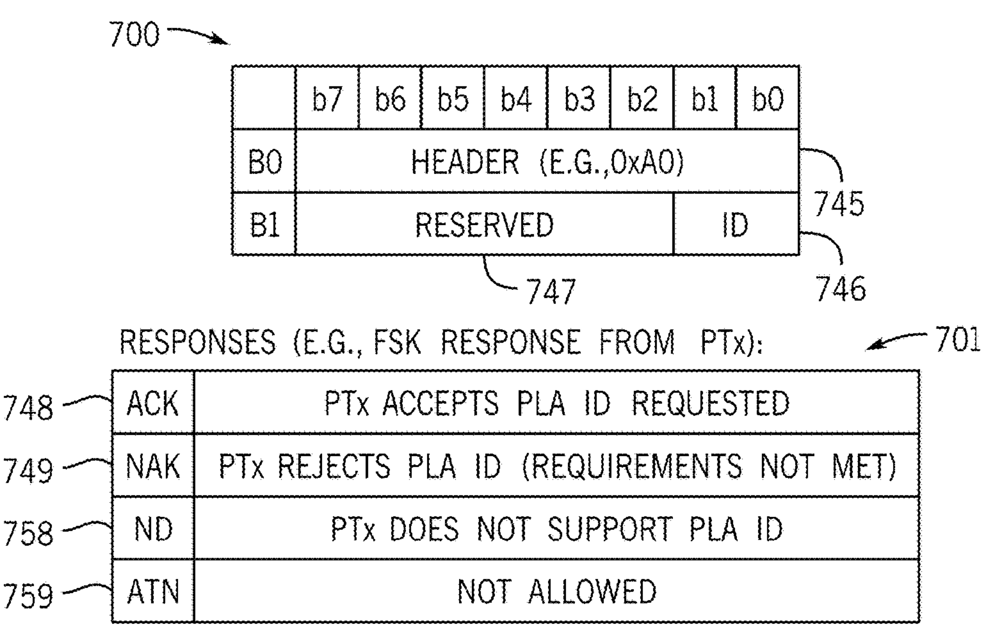
FIG. 7 illustrates an exemplary power loss accounting profile selection packet.
FIG. 8 illustrates an exemplary capability packet depicting a power limit reason field.

FIG. 7 illustrates an exemplary power loss accounting profile selection packet 700. This can be, for example, a power loss accounting profile selection packet sent by a PRx device to a PTx device. The power loss accounting profile selection packet 700 can include two bytes, identified as B0 and B1. Each byte can include eight bits, designated b0-b7, with b0 being the least significant bit. The first byte can be a packet header 745, which can have a predetermined value to identify the byte as a power loss accounting profile selection packet. In some embodiments, the packet header value can be 0xA0, corresponding to a bit sequence of 00010010. The second byte can include an ID field 746 specifying the power loss accounting profile to be selected. The ID field can use less than all of the bits of the second byte. In the illustrated example, it can use two bits, allowing for four different power loss accounting profiles, although other numbers of bits could be used to expand the number of available profiles. The remaining bits (747) of the second byte can be reserved for future use. In some embodiments, the power loss accounting profile selection packet 700 can be sent from the PRx to the PTx by the PRx employing amplitude shift keying (ASK) in-band communication, as described above with respect to FIG. 1. In some embodiments, the packet can be communicated by any other suitable communication technique, including both in-band and out-of-band communication.

Also illustrated in FIG. 7 is a list of responses 701 to the power loss accounting profile selection packet 700. In some embodiments, these responses can be responses from a PTx device sent to the PRx by frequency shift keying (FSK) in-band communication. In some embodiments any other suitable in-band or out-of-band communication technique can be used. The response can include an acknowledgement ("ACK") message 748, indicating that the PTx accepts the power loss accounting profile requested by the PRx device. The response can include a no acknowledgement ("NAK") message 749, indicating that the PTx does not accept the power loss accounting profile requested by the PRx device. This could be, for example, because the requirements for that particular power loss accounting profile have not been met, such as the required model coefficients not being provided. The response can include a not defined ("ND") message 758, indicating that the PTx does not support the power loss accounting profile requested by the PRx device. An attention "ATN" message 759 may not be allowed in response to the power loss accounting profile selection packet, with not allowed or otherwise undefined responses triggering a renegotiation or otherwise being ignored by the counterpart device. The power loss accounting profile selection packet and responses may be defined by a proprietary communication specification or may be incorporated into an industry standardized specification, such as the Qi family or wireless power transfer standards promulgated by the Wireless Power Consortium.

FIG. 8 illustrates an exemplary capability packet 800 depicting a power limit reason field 839. The capability packet 800 can include nine bytes (B0-B8), each including eight bits b0-b7. The various bits may correspond to certain data fields as defined as a capability or extended capability packet in a proprietary or industry-standard wireless power transfer protocol, such as the examples discussed above. Of note is the power limit reason field 839, illustrated as the four least significant bits (b0-b3) of the sixth byte B5. These bits may be used by a device, for example a PTx, to provide a reason why a power level lower than a power level requested by the counterpart device (for example a PRx) is being provided. For example, a power loss accounting profile may have a maximum power level associated therewith. Such information can be communicated in power limit reason field 839.

FIG. 9 illustrates an exemplary coefficient transfer packet 900 associated with a power loss accounting profile. In some embodiments, the coefficient transfer packet 900 can be sent by a PRx to a PTx using in-band ASK communication as described above. In some embodiments, the coefficient transfer packet 900 can be sent by a PTx to a PRx using in-band FSK communication. In some embodiments, the packet may be sent by other in-band or out-of-band communication. Exemplary coefficient packet 900 includes nineteen bytes B0-B18, each comprising eight bits b0-b7. In the illustrated example, a first byte B0 is reserved for future use, with the remaining bytes being allocated two-bytes per coefficient, allowing each coefficient to be represented by a sixteen-bit value. In some embodiments and/or for some coefficients, the sixteen-bit value can be a sixteen-bit signed integer represented in two's complement format. In some embodiments and/or for some coefficients, the sixteen-bit value can be a sixteen-bit unsigned number. The various coefficients exchanged can correspond to a power loss model corresponding to the power loss accounting profile, with the least significant bit corresponding to a default minimum resolution level appropriate for the value, unit, application, etc.

FIG. 9 also illustrates exemplary responses 901 to the coefficient transfer packet 900. Such responses could be sent by a PTx to the PRx via FSK modulation. In other embodiments, the response could be sent by either a PRx or PTx device using any suitable in-band or out-of-band communication technique. In some embodiments, the valid response to coefficient transfer packet 900 can be an acknowledgement ("ACK") message 951, indicating that the coefficients are received and acknowledged. Other responses, including not acknowledged ("NAK") message

952, a not defined ("ND") message 953, and/or an attention ("ATN") message 954 may trigger a renegotiation or otherwise be ignored by the counterpart device. This may trigger a resending of the coefficient power transfer packet or a complete renegotiation of the power loss accounting profile, as desired.

Figure 10:
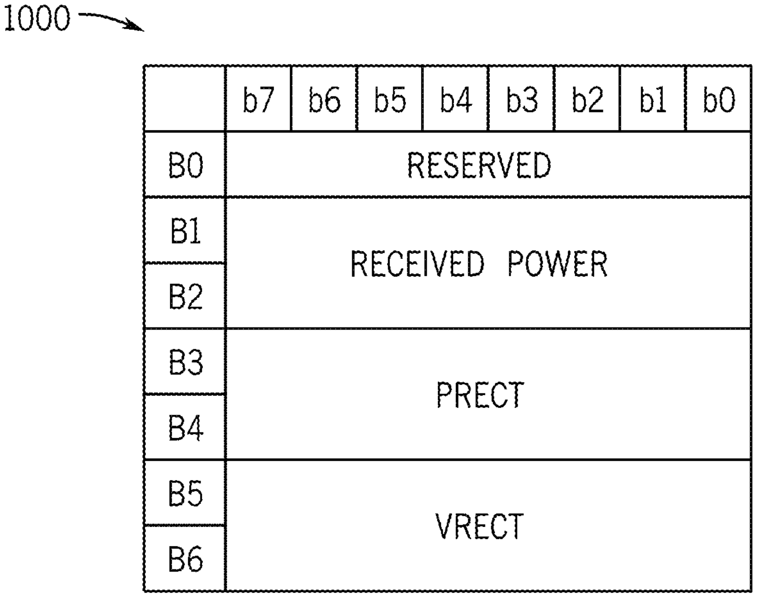
FIG. 10 illustrates an exemplary power reporting packet associated with a power loss accounting profile.

FIG. 10 illustrates an exemplary power reporting packet 1000 associated with a power loss accounting profile. In some embodiments, the power reporting packet 1000 can be sent by a PRx to a PTx using in-band ASK communication as described above. In some embodiments, the power reporting packet 1000 can be sent by a PTx to a PRx using in-band FSK communication. In some embodiments, the packet may be sent by other in-band or out-of-band communication. Exemplary power reporting packet 1000 can include seven bytes B0-B6, each comprising eight bits b0-b7. In the illustrated example, a first byte B0 is reserved for future use, with the remaining bytes being allocated with two bytes for the received power, two bytes for power at the rectifier, and two bites for the rectifier output voltage. (Rectifier in this case refers to the rectifier of the PRx device.) In other embodiments, where the PTx is reporting transmitted power to the PRx, there could be two bytes allocated to transmitted power, two bites to inverter voltage, and two bites to inverter current. In other embodiments, the bytes could be allocated in other ways, and more or fewer bytes could be used and/or more or fewer parameters transmitted. In the illustrated embodiment, the power levels can be sixteen-bit unsigned integers, with a resolution of 1 mW, and the voltage level can be a sixteen-bit unsigned integer with a resolution of 1 mV. Other scaling parameters could also be used as appropriate.

FIG. 10 also illustrates exemplary responses 1001 to the power reporting packet 1000. Such responses could be sent by a PTx to the PRx via FSK modulation. In other embodiments, the response could be sent by either a PRx or PTx device using any suitable in-band or out-of-band communication technique. One response to power reporting packet 1000 can be an acknowledgement ("ACK") message 961, indicating that the difference between the received power and transmitted power does not indicate the presence of a foreign object. An alternative response could include a not acknowledged ("NAK") message 962, indicating that a foreign object is possibly present and triggering a mitigation, such as a reduction or cessation of wireless power transfer. Another potential response could be not defined message 963, which might be not allowed, meaning that it would either be ignored by the recipient. An attention ("ATN") message 964 may be used to trigger a renegotiation of the power loss accounting profile.

Figure 11:
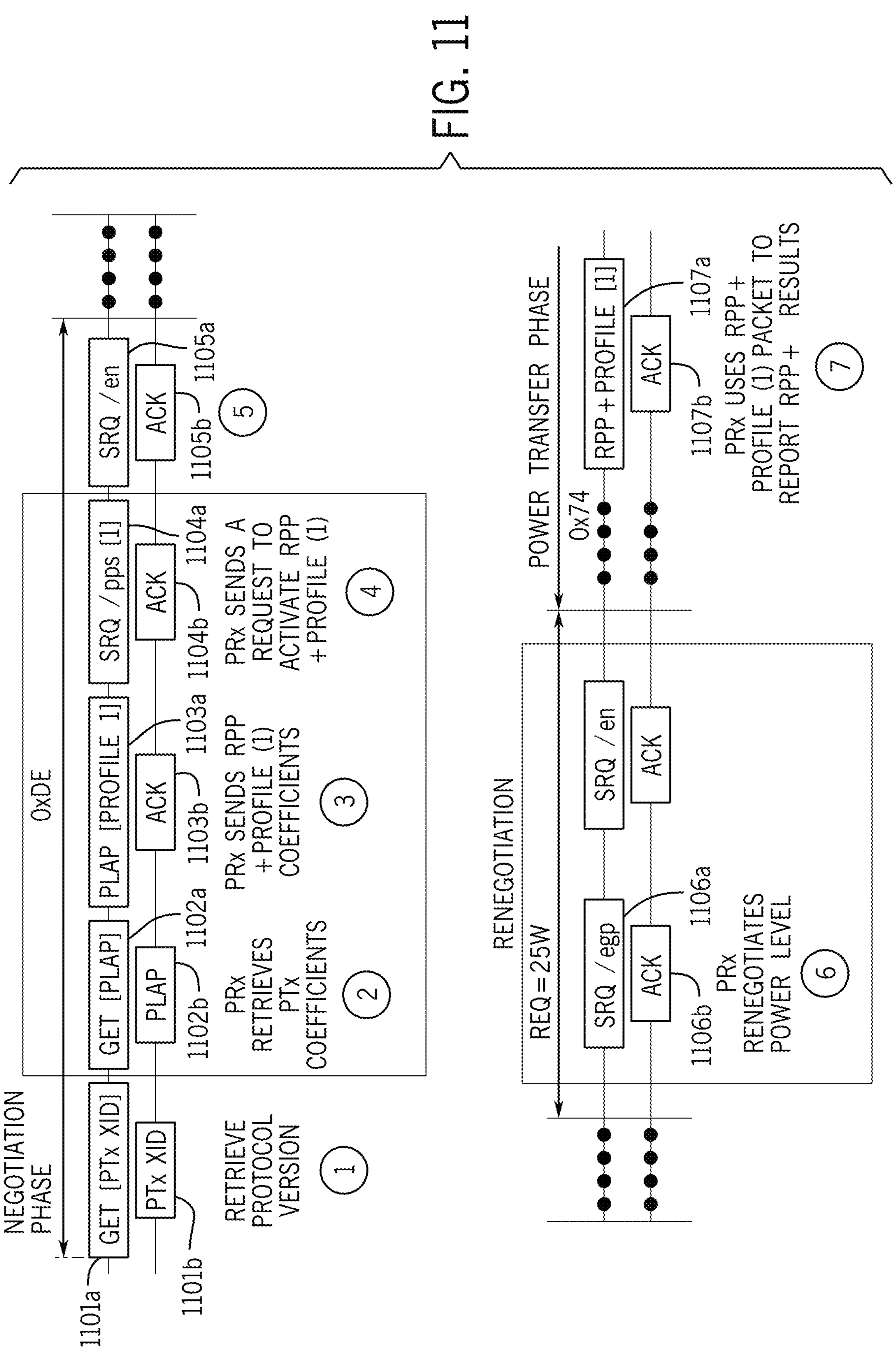
FIG. 11 illustrates an exemplary valid power loss accounting profile selection exchange.

FIG. 11 illustrates an exemplary valid power loss accounting profile selection exchange. Beginning in block 1, a PRx device can enter a negotiation phase by sending a message 1101*a* to confirm the PTx capabilities by requesting the PTx Protocol Version. If the response 1101*b* indicates power loss accounting profile support, in block 2, the PRx can request power loss accounting profile coefficients from PTx via message 1102*a*, with the PTx providing coefficients in response thereto by message 1102*b*. Then, in block 3, the PRx can send its corresponding profile coefficients to PTx via message 1103*a*, thereby meeting the requirements of the selected power loss accounting profile. PTx can acknowledge these coefficients with message 1103*b*.

In block 4, the PRx can select a new power loss accounting profile extension using SRQ/pps message 1104*a*, which can be acknowledged by the PTx via message 1104*b*. Thus, in block 5, the PRx can complete the negotiation for power loss accounting profile changes to take effect via message 1105*a*, which can be acknowledged by the PTx via message 1105*b*. Then, in block 6, the PRx can negotiate a higher power level (e.g., 25 W) allowed by the selected power loss accounting profile via message 1106*a*, which can be acknowledged by PTx via ACK message 1106*b*. PRx thus eventually enters the power transfer phase in block 7 and uses power reporting packet 1107*a* (as described above), which can be acknowledged by PTx via message 1107*b*.

Figure 12:
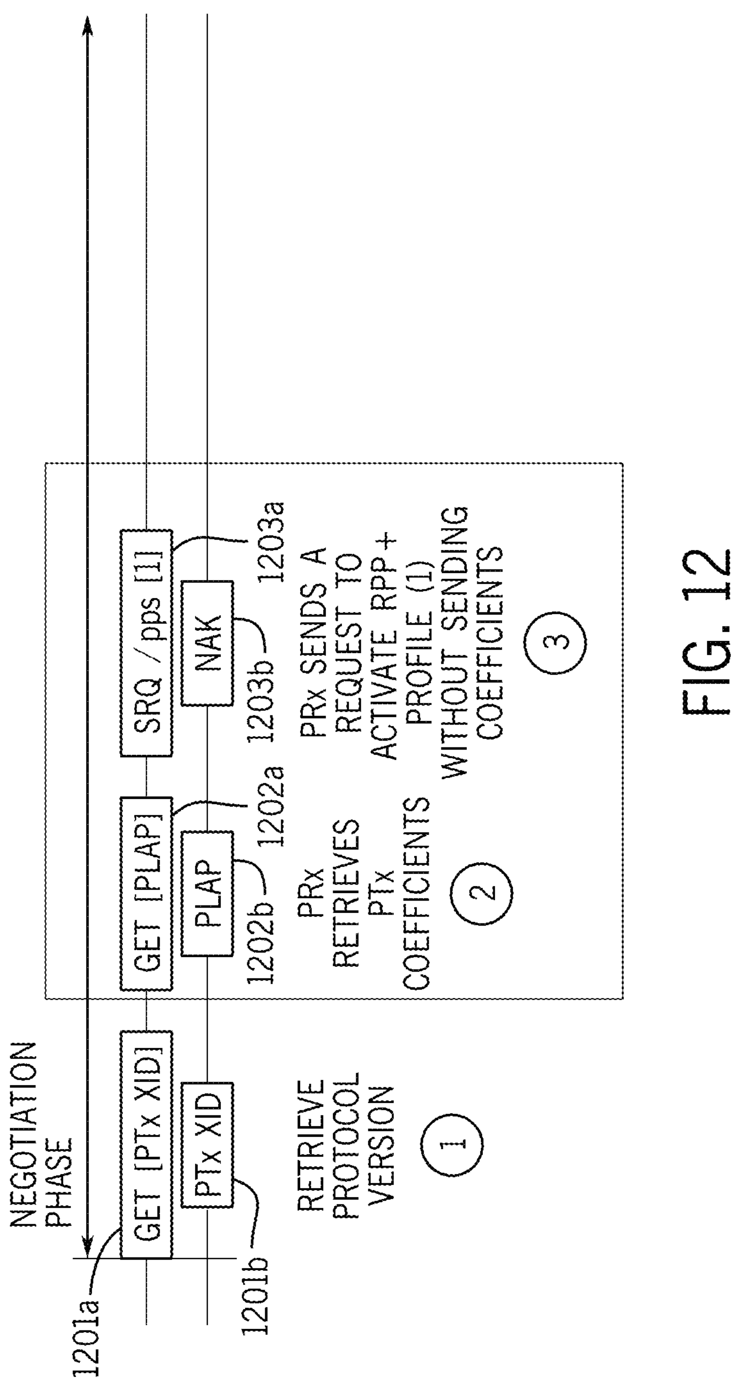
FIG. 12 illustrates an exemplary invalid power loss accounting profile selection exchange.

FIG. 12 illustrates an exemplary invalid power loss accounting profile selection exchange. In block 1, PRx can enter the negotiation phase and confirm the PTx capabilities by requesting the PTx protocol version (via message 1201*a*). If the response from the PTx (message 1201*b*) indicates PLA Profile Extension support, the PRx can request power loss accounting profile coefficients from PTx via message 1202*a*. The PTx can respond with its coefficients via message 1202*b*. Then, if the PRx selects a new PLA profile extension using message 1203*a*, without sharing coefficients and thus does not meet the requirements of the selected power loss accounting profile, the PTx can send a not acknowledged (NAK) message 1203*b*, triggering a renegotiation with proper coefficient exchange and otherwise meeting the requirements of the selected power loss accounting profile.

Figure 13:
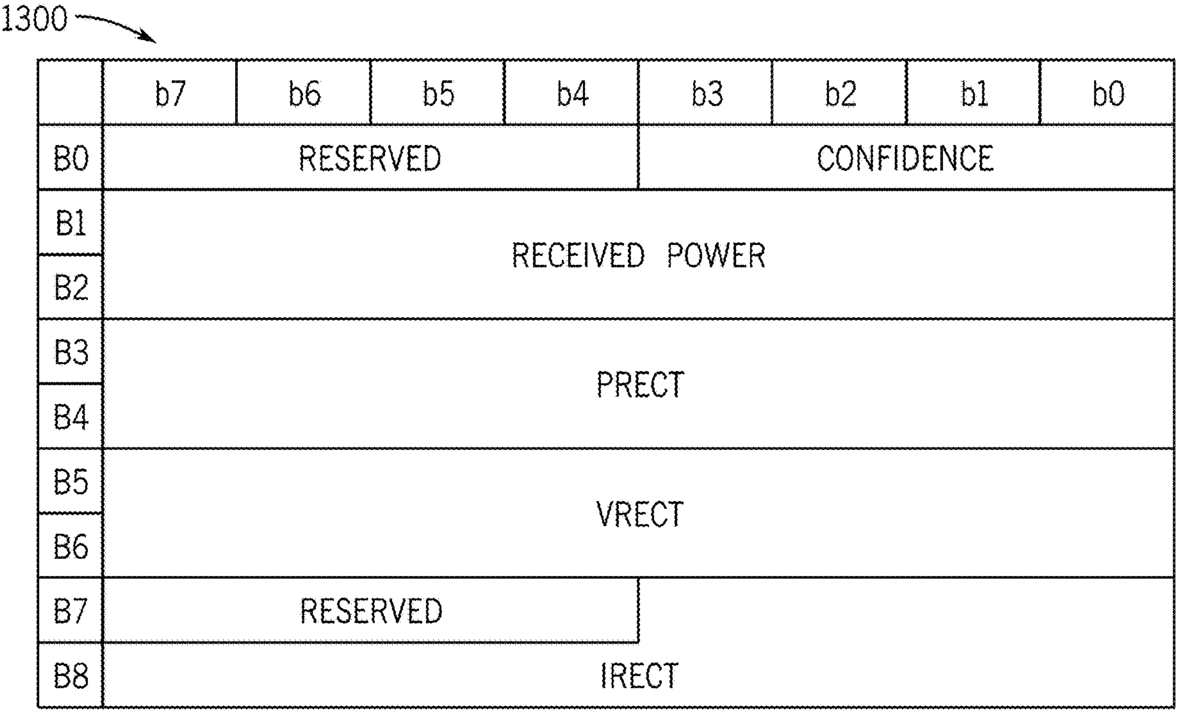
FIG. 13 illustrates an exemplary power reporting packet associated with an alternative power loss accounting profile.

FIG. 13 illustrates an exemplary power reporting packet 1300 associated with an alternative power loss accounting profile. Power reporting packet 1300 can be broadly similar to power reporting packet 1000 discussed above with respect to FIG. 10 but can include additional fields as described below. More specifically, power reporting packet 1300 can include nine bytes B0-B8, each including eight bits b0-b7. The first byte B0 can include two bits dedicated to a confidence level in the reported power level, described in greater detail below. The received power, rectifier power, and rectifier voltage can each use two bytes as described above with respect to FIG. 10. An additional two bytes (B7-B8) can be provided with four bits of one byte being reserved and the remaining 12 bits being used to represent the rectifier current Irect.

The confidence level bits can take on different values as illustrated in table 1302. For example, a value of 0 (bit sequence 00) can indicate low confidence, indicating that the reported data is unreliable, such as in terms of accuracy of the measurement. The receiving device may thus choose to disregard the specific values of this packet but may allow the packet to satisfy a timing or other requirement, although a sequence of several unreliable packets may trigger a timeout, power transfer reduction, power transfer cessation, or other mitigation measure. A value of 2 (bit sequence 10) can indicate high confidence, meaning that the data in the packet is reliable and can be used as described above. The other values 1 and 3 (corresponding to bit sequences 01 and 11) can be unused or reserved for profiles that allow varying levels of confidence in the reported values.

FIG. 13 also illustrates exemplary responses 1301 to the power reporting packet 1300. Such responses could be sent by a PTx to the PRx via FSK modulation. In other embodiments, the response could be sent by either a PRx or PTx device using any suitable in-band or out-of-band communication technique. One response to power reporting packet 1300 can be an acknowledgement ("ACK") message 1361, indicating that the difference between the received power and transmitted power does not indicate the presence of a foreign object. An alternative response could include a not acknowledged ("NAK") message 1362, indicating that a foreign object is possibly present and triggering a mitigation, such as a reduction or cessation of wireless power transfer. Another potential response could be not defined message 1363, which might be not allowed, meaning that it would either be ignored by the recipient. An attention ("ATN") message 964 may be used to trigger a renegotiation of the power loss accounting profile.

The above-described scenarios are merely illustrative examples and are not intended to be exhaustive of all the ways in which wireless power transfer devices can have and communicate a plurality of different operating modes to counterpart devices. Various permutations, combinations, and extensions of the arrangements described above could also be used as appropriate for a given application, system, and operating condition.

The foregoing describes exemplary embodiments of wireless power transfer systems power profiles for state synchronization between wireless power transmitter (PTx) and wireless power receiver (PRx). Such systems may be used in a variety of applications but may be particularly advantageous when used in conjunction with wireless power transfer systems for personal electronic devices such as mobile computing devices (e.g., laptop computers, tablet computers, smart phones, and the like) and their accessories (e.g., wireless earphones, styluses and other input devices, etc.) as well as wireless charging accessories (e.g., charging mats, pucks, stands, etc.). Although numerous specific features and various embodiments have been described, it is to be understood that, unless otherwise noted as being mutually exclusive, the various features and embodiments may be combined various permutations in a particular implementation. Thus, the various embodiments described above are provided by way of illustration only and should not be constructed to limit the scope of the disclosure. Various modifications and changes can be made to the principles and embodiments herein without departing from the scope of the disclosure and without departing from the scope of the claims.

The foregoing describes exemplary embodiments of wireless power transfer systems that are able to transmit certain information amongst the PTx and PRx in the system. The present disclosure contemplates this passage of information to improve the devices' ability to provide wireless power to each other in an efficient manner to facilitate battery charging, such as by sharing of the devices' power handling capabilities with one another. Entities implementing the present technology should take care to ensure that, to the extent any sensitive information is used in particular implementations, that well-established privacy policies and/or privacy practices are complied with. In particular, such entities would be expected to implement and consistently apply privacy practices that are generally recognized as meeting or exceeding industry or governmental requirements for maintaining the privacy of users. Implementers should inform users where personally identifiable information is expected to be transmitted in a wireless power transfer system and allow users to "opt in" or "opt out" of participation. For instance, such information may be presented to the user when they place a device onto a power transmitter, if the power transmitter is configured to poll for sensitive information from the power receiver.

The invention claimed is:

1. A method performed by control circuitry of a wireless power transmitter for negotiating a power loss accounting profile for detecting a foreign object influenced by an electromagnetic field associated with wireless power transfer from the wireless power transmitter to a wireless power receiver, the method comprising:

receiving from the wireless power receiver a request to operate according to a particular power loss accounting profile;

providing one or more transmitter coefficients associated with a model corresponding to the particular power loss accounting profile to the wireless power receiver;

receiving from the wireless power receiver one or more receiver coefficients associated with the model corresponding to the particular power loss accounting profile;

receiving from the wireless power receiver an indication of received power associated with the wireless power transfer;

determining a measured power loss associated with the wireless power transfer by comparing the indication of received power from a transmitted wireless power measured by the wireless power transmitter;

computing a predicted power loss based on the indication of received power, the one or more transmitter coefficients, the one or more receiver coefficients, and the model corresponding to the particular power loss accounting profile;

determining that a foreign object is present if the measured power loss exceeds the predicted power loss by more than a threshold; and if a foreign object is present, mitigating presence of the foreign object by reducing a power level of or suspending the wireless power transfer.

2. The method of claim 1 wherein the particular power loss accounting profile includes a model of the wireless power transfer system defined by one or more equations and the one or more coefficients and defines the format and content of messages for communications between wireless power transmitter and wireless power receiver.

3. The method of claim 2 wherein the messages include:

a power profile selection message including an identifier representing the particular power loss accounting profile; and a definition of allowed and disallowed responses to the power profile selection message.

4. The method of claim 2 wherein the messages include a capability indication message specifying a power limit associated with the particular power loss accounting profile and reason for the power limit.

5. The method of claim 2 wherein the messages include:

a coefficient transfer message including one or more coefficients associated with the model; and a definition of allowed and disallowed responses to the coefficient transfer message.

6. The method of claim 2 wherein the messages include:

a power reporting message indicating at least a received power measurement; and a definition of allowed and disallowed responses to the power reporting message.

7. The method of claim 6 wherein the power reporting message also includes at least one of:

a rectifier power and rectifier voltage corresponding to the received power measurement;

a confidence level in the received power measurement; and a rectifier current measurement.

8. The method of claim 1 wherein the power loss accounting profile defines at least one of:

timings associated with power measurement windows or intervals and timers specifying the frequency of power measurements and timeouts associated with failure to receive an appropriate message; and behaviors specifying actions to be taken by the wireless power transmitter or wireless power receiver under various operating condition.

9. A wireless power transmitter comprising:

a wireless power transmitter coil configured to magnetically couple to a wireless power receiver coil of a wireless power receiver to wirelessly transfer power to the wireless power receiver;

an inverter configured to receive input power and generate an output that drives the wireless power transmitter coil; and controller and communication circuitry coupled to the inverter and the wireless power transmitter coil that controls the inverter to regulate wireless power transfer to the wireless power receiver, wherein the controller and communication circuitry includes logic or programming for negotiating a power loss accounting profile for detecting a foreign object influenced by an electromagnetic field associated with wireless power transfer from the wireless power transmitter to the wireless power receiver by:

receiving from the wireless power receiver a request to operate according to a particular power loss accounting profile;

providing one or more transmitter coefficients associated with a model corresponding to the particular power loss accounting profile to the wireless power receiver;

receiving from the wireless power receiver one or more receiver coefficients associated with the model corresponding to the particular power loss accounting profile;

receiving from the wireless power receiver an indication of received power associated with the wireless power transfer;

determining a measured power loss associated with the wireless power transfer by subtracting the indication of received power from a transmitted wireless power measured by the wireless power transmitter;

computing a predicted power loss based on the indication of received power, the one or more transmitter coefficients, the one or more receiver coefficients, and the model corresponding to the particular power loss accounting profile; and determining that a foreign object is present if the measured power loss exceeds the predicted power loss by more than a threshold;

wherein the controller and communication circuitry further comprises logic or programming that, if a foreign object is present, mitigates presence of the foreign object by reducing a power level of or suspending the wireless power transfer.

10. The wireless power transmitter of claim 9 wherein the particular power loss accounting profile includes a model of the wireless power transfer system defined by one or more equations and the one or more coefficients.

11. The wireless power transmitter of claim 9 wherein the power loss accounting profile defines the format and content of messages for communications between wireless power transmitter and wireless power receiver.

12. The wireless power transmitter of claim 11 wherein the messages include:

a power profile selection message including an id of the particular power loss accounting profile; and a definition of allowed and disallowed responses to the power profile selection message.

13. The wireless power transmitter of claim 11 wherein the messages include a capability indication message specifying a power limit associated with the particular power loss accounting profile and reason for the power limit.

14. The wireless power transmitter of claim 11 wherein the messages include:

a coefficient transfer message including one or more coefficients associated with the model; and a definition of allowed and disallowed responses to the coefficient transfer message.

15. The wireless power transmitter of claim 11 wherein the messages include:

a power reporting message indicating at least a received power measurement; and a definition of allowed and disallowed responses to the power reporting message.

16. The wireless power transmitter of claim 11 wherein the power reporting message also includes at least one of:

a rectifier power and rectifier voltage corresponding to the received power measurement;

a confidence level in the accuracy of the received power measurement; and a rectifier current measurement.

17. The wireless power transmitter of claim 9 wherein the power loss accounting profile defines at least one of:

timings associated with power measurement windows or intervals and timers specifying the frequency of power measurements and timeouts associated with failure to receive an appropriate message; and actions to be taken by the wireless power transmitter or wireless power receiver under various operating conditions.

* * * * *